(12) United States Patent
Beilstein

(10) Patent No.: US 8,347,439 B1
(45) Date of Patent: Jan. 8, 2013

(54) REDUCED HEIGHT COMBINATION RAMP AND LOAD LEVELER

(76) Inventor: Richard R. Beilstein, Cedarburg, WI (US)

( * ) Notice: Subject to any disclaimer, the term of this patent is extended or adjusted under 35 U.S.C. 154(b) by 37 days.

(21) Appl. No.: 13/023,570

(22) Filed: Feb. 9, 2011

Related U.S. Application Data

(63) Continuation-in-part of application No. 12/561,791, filed on Sep. 17, 2009, now Pat. No. 7,930,788.

(51) Int. Cl.
*E01D 1/00* (2006.01)
(52) U.S. Cl. .......................................................... 14/69.5
(58) Field of Classification Search ................... 14/69.5
See application file for complete search history.

(56) References Cited

U.S. PATENT DOCUMENTS

| | | | | |
|---|---|---|---|---|
| 4,874,284 A * | 10/1989 | New, Jr. ...................... | 414/537 |
| 5,035,565 A * | 7/1991 | White ......................... | 414/537 |
| 5,062,174 A * | 11/1991 | DaSalvo ....................... | 14/69.5 |
| 5,306,113 A * | 4/1994 | Mann ........................... | 414/537 |
| 6,389,629 B1 * | 5/2002 | Schouest ...................... | 14/69.5 |
| 6,837,669 B2 * | 1/2005 | Reed et al. ................... | 414/537 |
| 7,179,042 B1 * | 2/2007 | Hartmann et al. ............ | 414/537 |
| 7,310,842 B2 * | 12/2007 | Frahm et al. ................. | 14/69.5 |
| 7,810,196 B1 * | 10/2010 | Pritchard et al. ............. | 14/69.5 |
| 7,966,685 B2 * | 6/2011 | Van Beek et al. ............ | 14/71.1 |
| 2005/0055783 A1 * | 3/2005 | Peschmann .................. | 14/69.5 |
| 2007/0020073 A1 * | 1/2007 | Chaddock .................... | 414/483 |
| 2009/0016865 A1 * | 1/2009 | Astor et al. .................. | 414/430 |

* cited by examiner

*Primary Examiner* — Raymond W Addie
(74) *Attorney, Agent, or Firm* — Donald J. Ersler

(57) ABSTRACT

A reduced height combination ramp and load leveler includes at least two lengthwise support members, a plurality of cross members and plurality of cross treads. A retention tube is secured to each end of the at least two lengthwise support members. The at least two lengthwise support members and the plurality of cross members are preferably fabricated from an aluminum alloy having a tensile strength of at least 50,000 to reduce a height of the combination ramp and load leveler. Two stake receivers allow a single ramp to be used as a load leveler. Each stake receiver is sized to removably receive an adjustable stake. A ramp stand includes a support base and an adjustable tube receiver that is vertically postionable relative to the support base. The adjustable tube receiver retains the retention tubes.

20 Claims, 14 Drawing Sheets

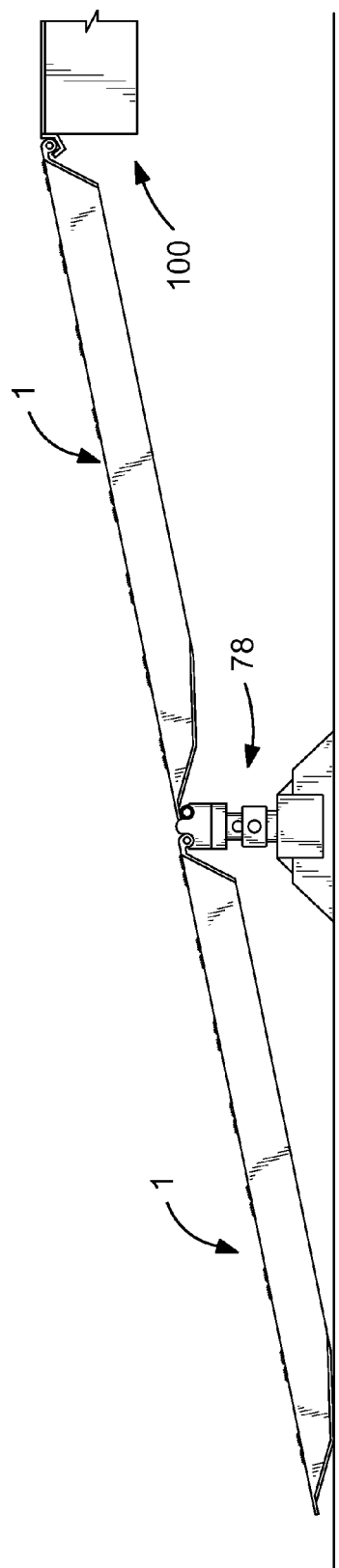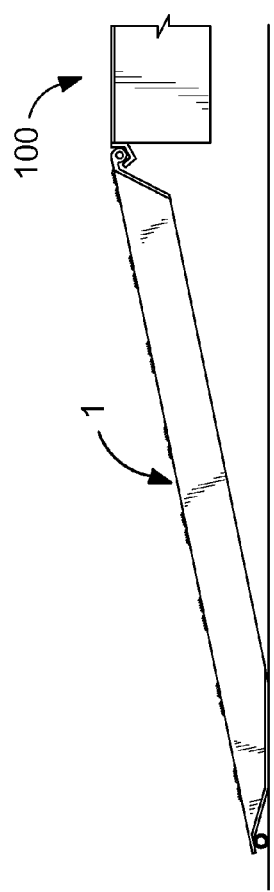

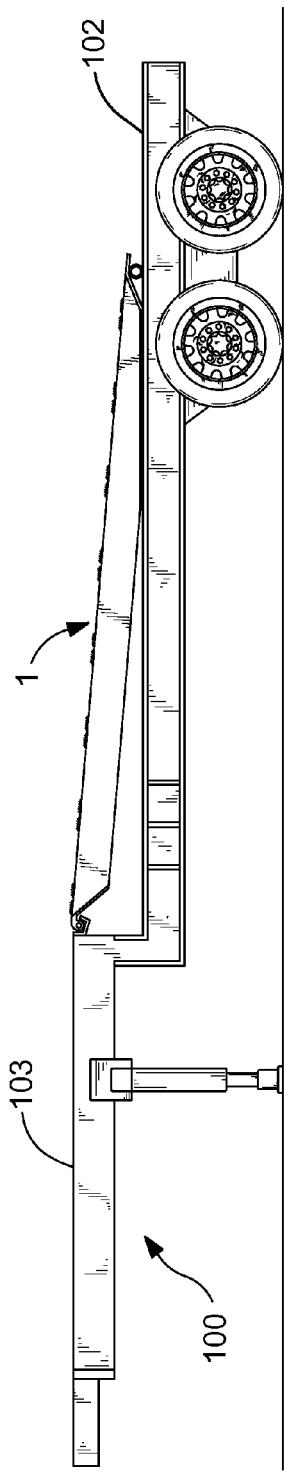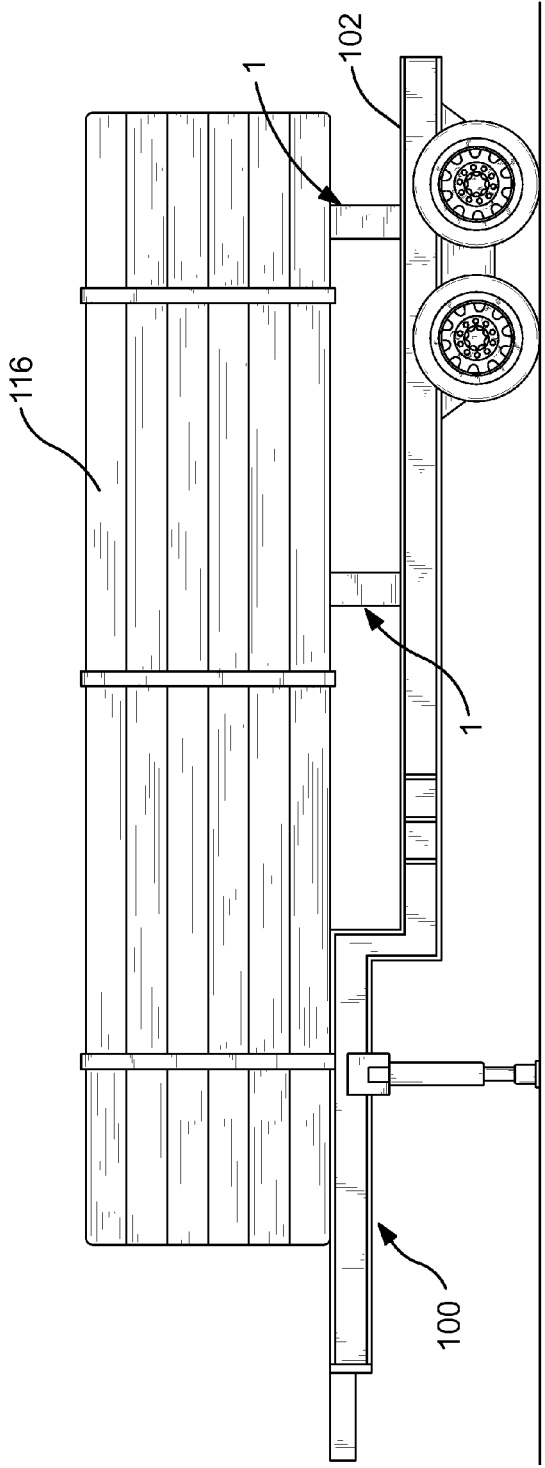
FIG. 13a
FIG. 13

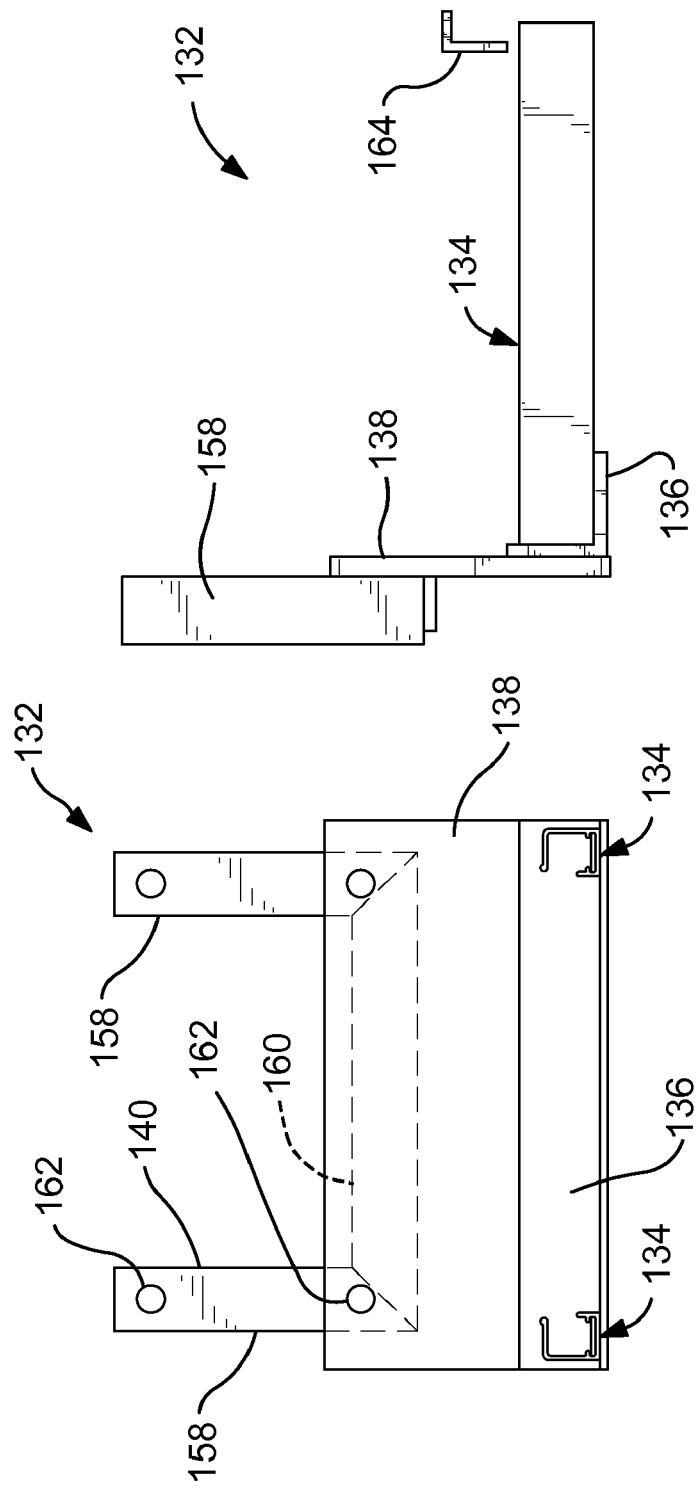

REDUCED HEIGHT COMBINATION RAMP AND LOAD LEVELER

CROSS-REFERENCES TO RELATED APPLICATIONS

This is a continuation-in-part patent application taking priority from nonprovisional application Ser. No. 12/561,791 (now U.S. Pat. No. 7,930,788), filed on Sep. 17, 2009.

BACKGROUND OF THE INVENTION

1. Field of the Invention

The present invention relates generally to ramps and load levelers and more specifically to a reduced height combination ramp and load leveler, which may be used as either a ramp or a load leveler on an open drop deck semi-trailer.

2. Discussion of the Prior Art

A load leveler is used to support loads on an open drop deck semi-trailer. The load leveler includes two stakes that fit into two stake pockets formed in a bed of the semi-trailer. However, most open drop deck semi-trailers have different widths. The different widths of open drop deck semi-trailers include varying distances between opposing stake pockets. A load leveler with a set distance between the stake pockets for one manufacturer of semi-trailers may not work for another manufacturer of open drop deck semi-trailers. Typically, the distance between stake pockets on the open drop deck semi-trailers has a range of between 97-98 inches.

A ramp allows vehicles to be driven on to an open drop deck semi-trailer. Storing two ramps on top of each other, under a bed of an open drop deck semi-trailer results in a bottom of the lower ramp extending beyond a bottom of I-beam of an open drop deck semi-trailer. The ramp extending below the I-beam can result in problems going over railroad tracks and other protrusions in a road surface. The bottom of the lower ramp will be destroyed by the railroad track or other protrusion in the road surface.

Accordingly, there is a clearly felt need in the art for a reduced height combination ramp and load leveler, which allows a single length of ramp/load leveler to be used on open drop deck semi-trailers having different distances between stake pockets and allows two ramps to be stacked on top of each other without a bottom of the lower ramp/load leveler extending past a bottom of the open drop deck semi-trailer I-beam.

SUMMARY OF THE INVENTION

The present invention provides a reduced height combination ramp and load leveler, which may be used as either a ramp or a load leveler on an open drop deck semi-trailer. The reduced height combination ramp and load leveler (combination ramp and load leveler) includes at least two lengthwise support members, a plurality of cross members and plurality of cross treads. The plurality of cross members are attached between the at least two lengthwise support members. The plurality of cross treads are attached across a top of the at least two lengthwise support members to support a vehicle wheel. A first attachment end is secured to one end of the at least two lengthwise support members and a second attachment end is secured to the other end of the at least two lengthwise support members. Each attachment end includes a cover plate and a retention tube.

The at least two lengthwise support members and the plurality of cross members are preferably fabricated from a 6082 T6 aluminum. The 6082 T6 aluminum provides greater strength than typical aluminum alloys. The greater strength allows a height of the two lengthwise support members and the plurality of cross members to be reduced in height from about 6.25 inches to 5.25 inches or less.

Two stake receivers allow a single ramp to be used as a load leveler. Each stake receiver includes a stake section to receive an adjustable stake and a receiver section to receive the retention tube. The adjustable stake includes a receiver portion and a stake portion. The stake portion is sized to be received by a stake pocket in an open drop deck semi-trailer. The receiver portion is sized to be received by the stake receiver. At least one adjustable stake is rotated 180 degrees to accommodate different distances between stake pockets. A chain tie is attached to a top of the stake receiver to retain a tie down chain.

A ramp stand includes a support base and an adjustable tube receiver. The support base includes two receiver members and a stand cross member. One receiver member is secured to one side of the stand cross member and the other receiver member is secured to the other side of the stand cross member. The adjustable tube receiver includes a support cross member, two tube extensions and two locking rods. The two tube extensions extend downward from each end of a bottom of the support cross member. Two adjacent semi-circular grooves are formed across a length of the support cross member to each receive a retention tube. Two rod loops are formed on each end of the support cross member, concentric with the two semi-circular grooves. The two locking rods are inserted through the two retention tubes when combination ramps and load levelers are supported by the ramp stand. The tube extensions are sized to be received by the two receiver members. The tube extension includes a plurality of holes for adjusting the height thereof relative to receiver member by insertion of a level pin.

Accordingly, it is an object of the present invention to provide a combination ramp and load leveler, which allows a single length of ramp/load leveler to be used on semi-trailers having different distances between stake pockets.

Finally, it is another object of the present invention to provide a combination ramp and load leveler, which allows two ramps to be stacked on top of each other without a bottom of the lower ramp/load leveler extending past a bottom of the open drop deck semi-trailer I-beam.

These and additional objects, advantages, features and benefits of the present invention will become apparent from the following specification.

BRIEF DESCRIPTION OF THE DRAWINGS

FIG. 10 is a side view of a ramp stand supporting two combination ramp and load levelers in accordance with the present invention.

FIG. 10a is a side view of a combination ramp and load leveler retained on an open drop deck semi-trailer in accordance with the present invention.

FIG. 13 is a side view of two combination ramp and load levelers supporting a plurality of poles on an open drop deck semi-trailer in accordance with the present invention.

FIG. 13a is a side view of a combination ramp and load leveler retained on an open drop deck semi-trailer leading to an upper bed from a lower bed in accordance with the present invention.

FIG. 18 is a front view of a ramp stand hanger for a combination ramp and load leveler in accordance with the present invention.

FIG. 19 is a side view of a ramp stand hanger for a combination ramp and load leveler in accordance with the present invention.

DETAILED DESCRIPTION OF THE PREFERRED EMBODIMENTS

Figure 1:
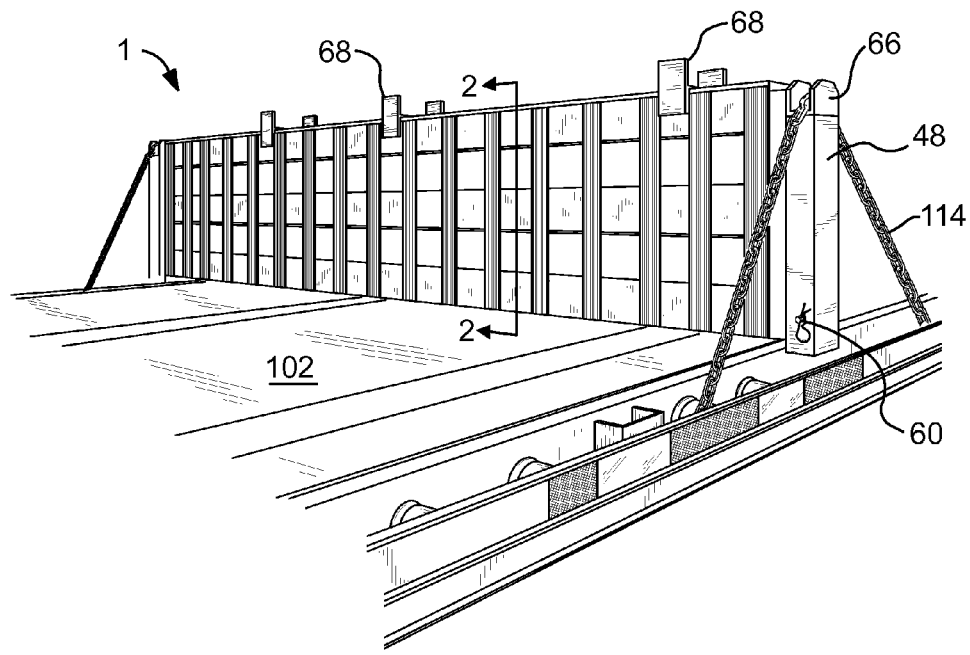
FIG. 1 is a perspective view of a combination ramp and load leveler retained on an open drop deck semi-trailer in accordance with the present invention.

With reference now to the drawings, and particularly to FIG. 1, there is shown a perspective view of a combination ramp and load leveler 1. With reference to FIGS. 1a-4, the combination ramp and load leveler 1 includes at least two lengthwise support members 10, a plurality of cross members 12 and a plurality of cross treads 14. The plurality of cross members 12 are attached between the at least two lengthwise support members 10, preferably with welding. The at least two lengthwise support members 10 and the plurality of cross members 12 are preferably fabricated from 6082 T6 aluminum tubing.

It is preferably to have the horizontal walls 11 thicker than the vertical walls 15 of the lengthwise support member, such that a>b to decrease weight of the lengthwise support members 10. The 6082 T6 aluminum tubing has a tensile strength of at least 50,000 psi. A typical aluminum tubing, such as 6061 T6 has a tensile strength of 38,000 psi. The increased tensile strength of the 6082 T6 aluminum allows the height of the combination ramp and load leveler 1 to be reduced to 5.25 inches or less. The combination ramp and load leveler 1 has a preferable 18 inch width, a 96 inch length and a weight of about 92 pounds. The combination ramp and load leveler 1 also has a preferable 20 inch width, a 96 inch length and a weight of about 94 pounds. The weight of the combination ramp and load leveler is 92-94 pounds to allow thereof to lifted by one person. Finally, the load carrying capacity of the combination ramp and load leveler 1 is preferably at least 10,500 pounds with a safety factor of not less than 2:1.

Figure 5:
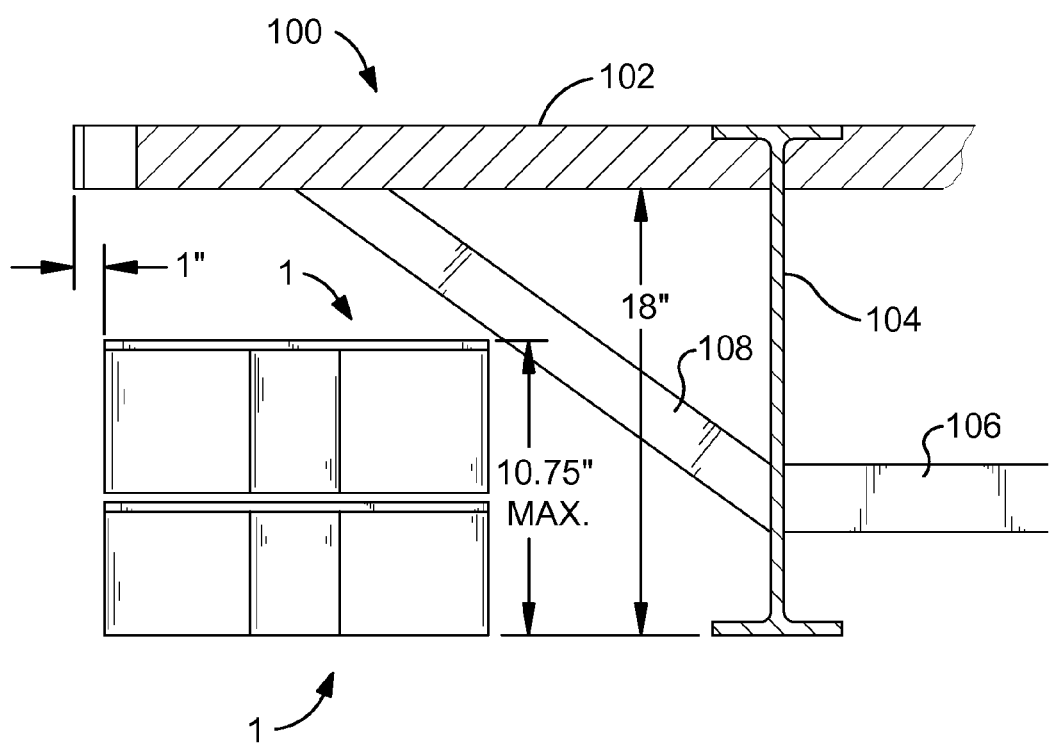
FIG. 5 is an end view of two combination ramp and load levelers retained under an open drop deck semi-trailer in accordance with the present invention.
Figure 6:
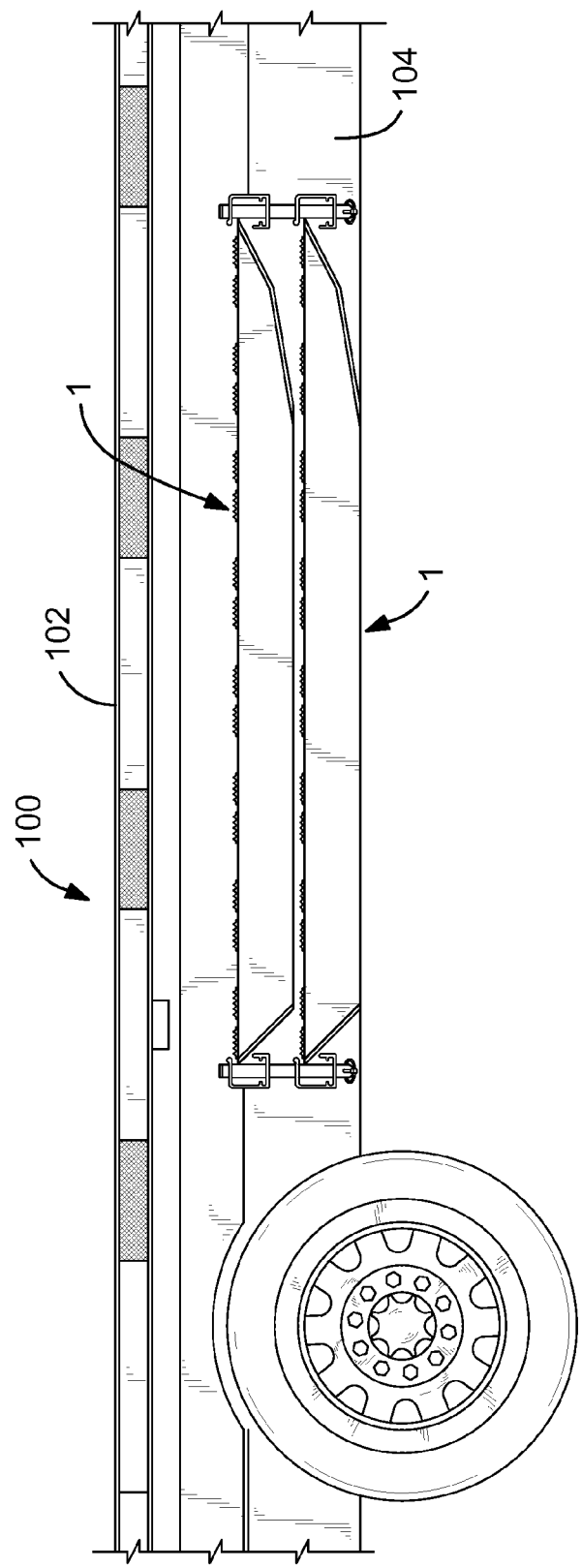
FIG. 6 is a side view of two combination ramp and load levelers retained under an open drop deck semi-trailer in accordance with the present invention.

With reference to FIGS. 5-6, a cross section of an open drop deck semi-trailer 100 is shown with two combination ramp and load levelers 1 retained under a bed 102 of the open drop deck semi-trailer 100. The open drop deck semi-trailer includes the bed 102, at least one I-beam 104, a cross member 106 and a gusset support 108. Storage of the two combination ramp and load levelers 1 under the open drop deck semi-trailer is limited by the gusset support 108. The gusset support 108 forces a combination ramp and load leveler 1 to extend below a bottom 110 of the I-beam 104. A typical ramp is 6.25 inches high and 18-20 inches wide. The width of the combination ramp and load leveler 1 cannot be narrowed, but the height thereof can be decreased, such that a bottom of the two combination ramp and load levelers 1 do not extend below a bottom of the I-beam 104. A ramp with a height of 5.25 inches or less will be flush with the bottom 110 of the I-beam 104. Storage of the combination ramp and load levelers 1 below the bed 102 of the open drop deck semi-trailer allows the driver to haul more on top of the bed 102.

The plurality of cross treads 14 are attached across a top of the at least two lengthwise support members 10, preferably with welding to support a vehicle wheel. However, other vehicle wheel supports may also be used, besides the plurality of cross treads 14. Each cross tread 14 preferably includes a plurality of lengthwise traction grooves 16. A first end of the at least two lengthwise support 10 includes a first miter cut 18 and a second miter cut 20. A first attachment end 22 is secured to the first end of the at least two lengthwise support members 10, preferably with welding. The purpose of the first and second miter cuts is to enable the manufacture of only one ramp instead of having to make many different ramps for open drop deck semi-trailers with different load heights. A second end of the at least two lengthwise support members 10 includes a third miter cut 24. A second attachment end 26 is secured to the second end of the at least two lengthwise support members 10, preferably with welding.

The first attachment end 22 includes a first cover plate 28 and a first retention tube 30. The first cover plate 32 includes a first tube flange 34, a first leg 36 and a second leg 38. One end of the first leg 36 extends downward from the first tube flange 34 and the second leg 38 extends outward from the other end of the first leg 36. The first retention tube 30 is attached to a bottom of the first tube flange 34. The second attachment end 26 includes a second cover plate 40 and a second retention tube 42. The second cover plate 40 includes a second tube flange 44 and a third leg 46. The third leg 46 extends downward from the second tube flange 44. The second retention tube 42 is attached to a bottom of the second tube flange 44.

Figure 11:
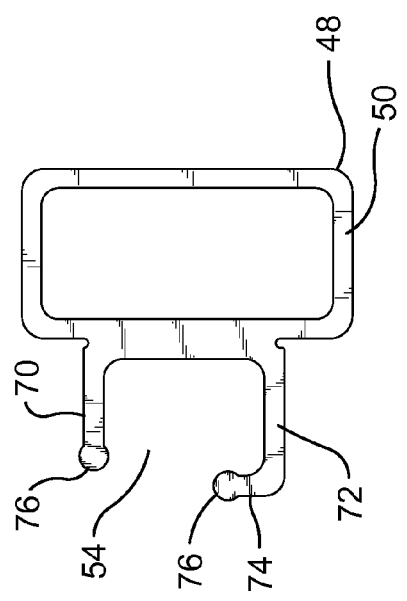
FIG. 11 is an enlarged end view of a stake receiver of a combination ramp and load leveler in accordance with the present invention.
Figure 12:
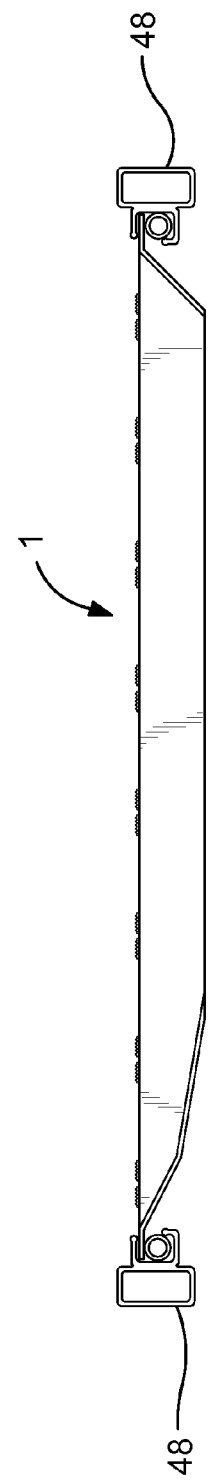
FIG. 12 is a top view of a combination ramp and load leveler retained between two stake receivers in accordance with the present invention.
Figure 14:
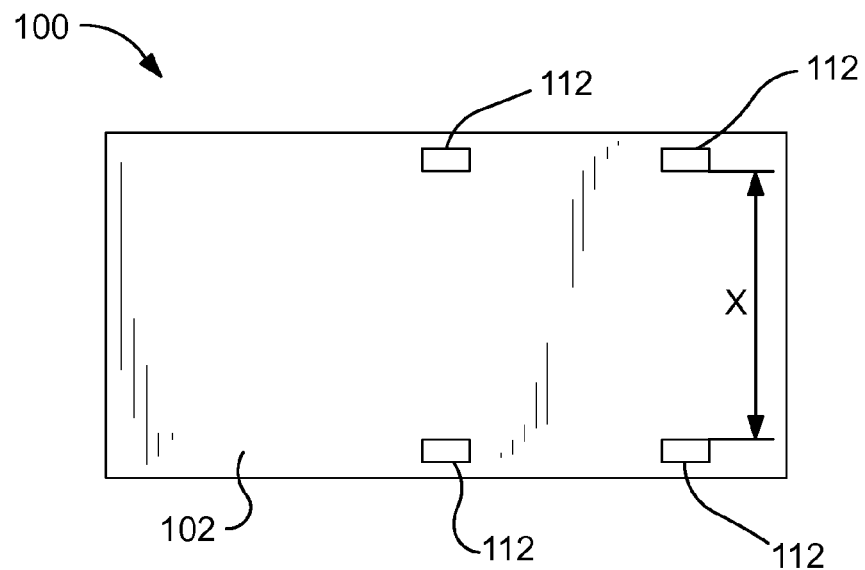
FIG. 14 is a top view of a open drop deck semi-trailer bed with four stake pockets.
Figure 15:
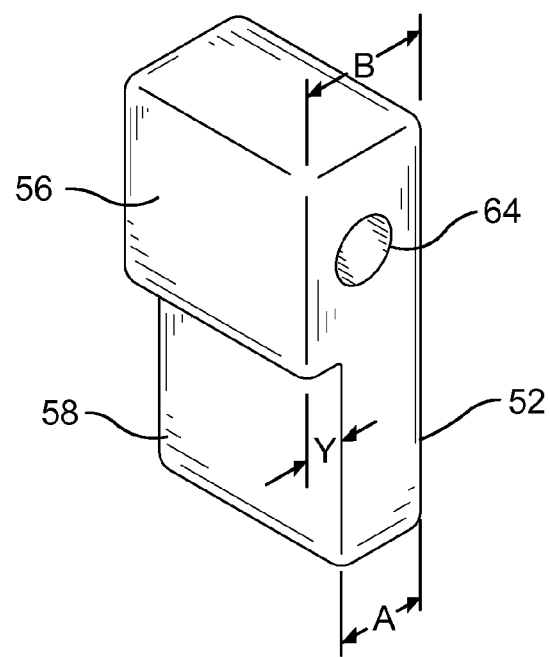
FIG. 15 is a perspective view of an adjustable stake of a combination ramp and load leveler in accordance with the present invention.

With reference to FIGS. 1, 11 and 12, two opposing stake receivers 48 allow a single combination ramp and load leveler 1 to be used as a load leveler. With reference to FIG. 11, each stake receiver 48 includes a stake section 50 to receive an adjustable stake 52 and a receiver section 54 to receive the first or second retention tubes. The stake section 50 has a tubular cross section. The adjustable stake 52 includes a receiver portion 56 and a stake portion 58. With reference to FIG. 14, the stake portion 58 is sized to be received by a stake pocket 112 in an open drop deck semi-trailer 100. The receiver portion 56 is sized to be received by the stake section 50.

Figure 16:
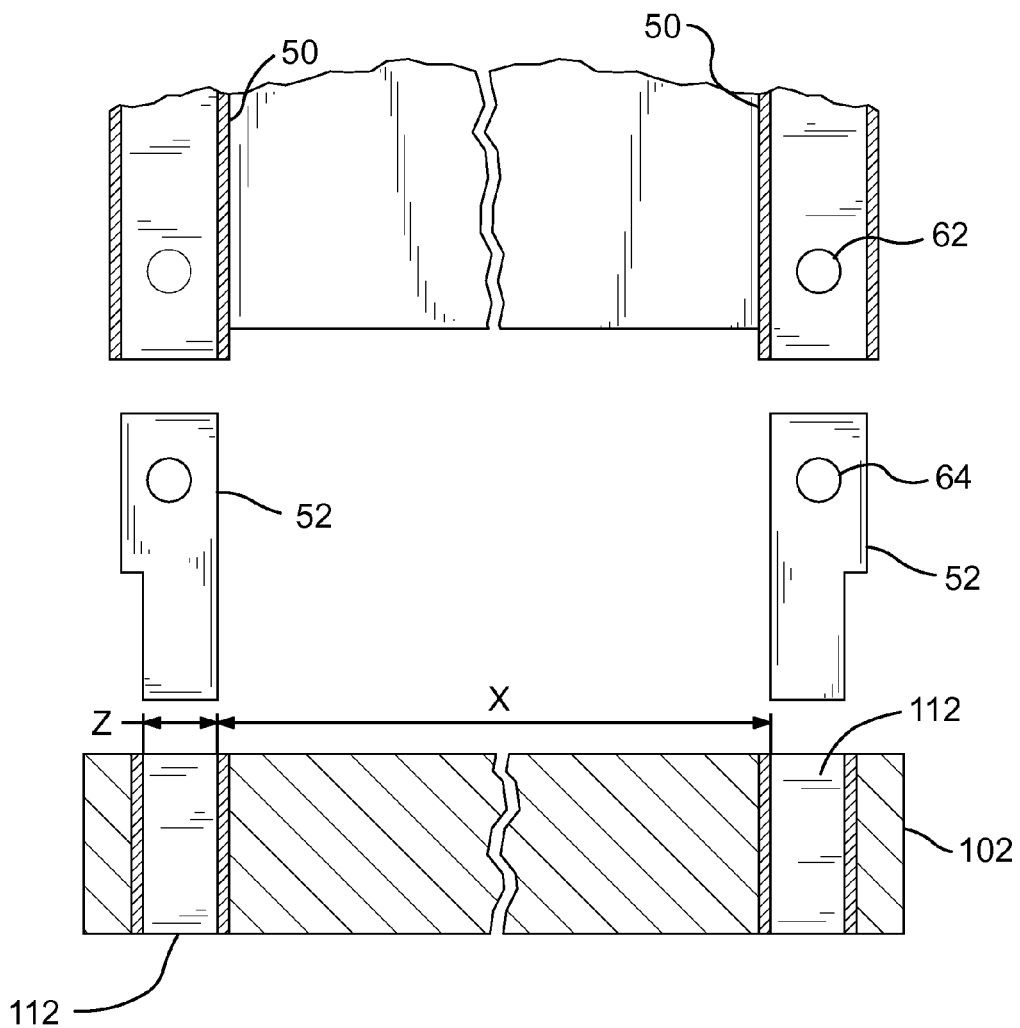
FIG. 16 is a cross sectional exploded front view of two stake receivers with two adjustable stakes positioned to be inserted into stake pockets of an open drop deck semi-trailer with a minimum distance between the stake pockets in accordance with the present invention.
Figure 17:
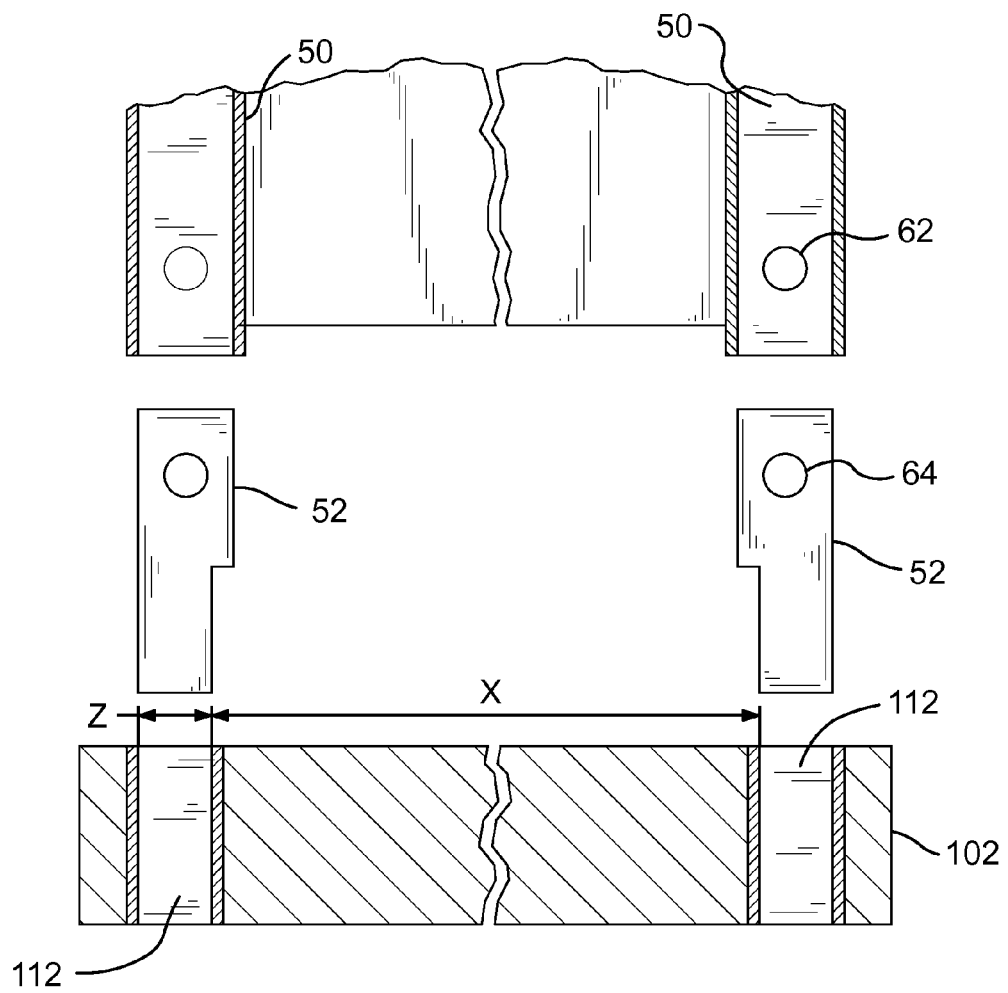
FIG. 17 is a cross sectional exploded front view of two stake receivers with two adjustable stakes positioned to be inserted into stake pockets of an open drop deck semi-trailer with a maximum distance between the stake pockets in accordance with the present invention.

With reference to FIGS. 16-17, a width "A" of the stake portion 58 is smaller than a width "B" of the receiver portion 56. The difference between width "A" and width "B" is distance "Y." The distance "Y" is preferably ¼ inch to allow the combination ramp and load leveler 1 to be retained in any open drop deck semi-trailer. An inside width "Z" of the stake pocket 112 provides a clearance of Z-A between the stake pocket 112 and the stake portion 58. It is preferable that the clearance of Z-A be at least ⅜ inch. Rotating both adjustable stakes 52, 180 degrees allows the distance between stake portion 58 to be adjusted to be 96.88 to 98.12. The adjustable stake 52 is retained in the stake section 50 with a pin 60 inserted through a receiver pin hole 62 formed through the stake section 50 and a stake pin hole 64 formed through the receiver portion 24.

Figure 1A:
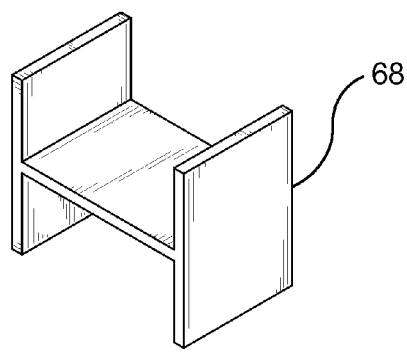
FIG. 1a is an enlarged perspective view of a load retention bracket of a combination ramp and load leveler in accordance with the present invention.
Figure 2:
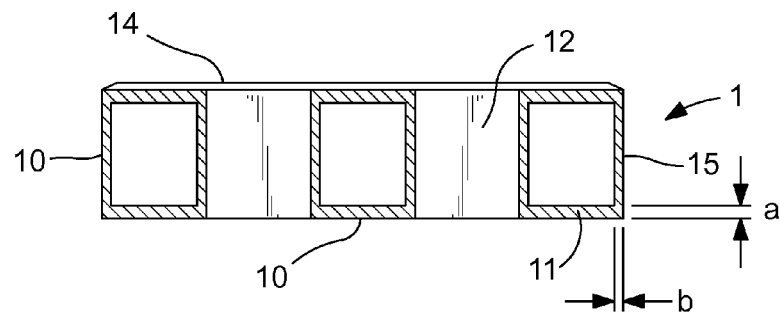
FIG. 2 is a cross sectional view of a combination ramp and load leveler in accordance with the present invention.
Figure 3:
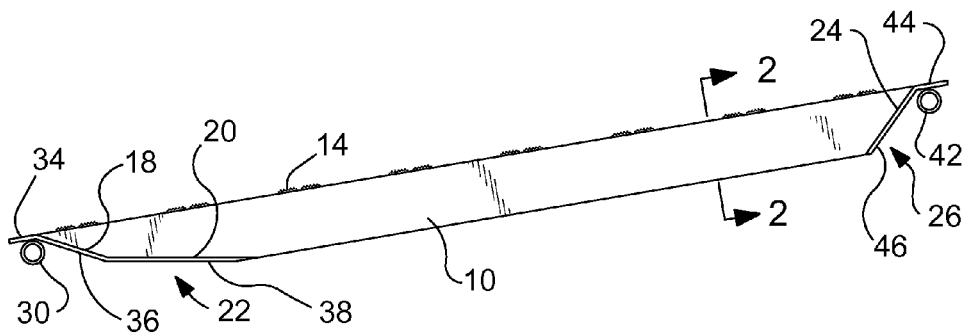
FIG. 3 is a side view of a combination ramp and load leveler in accordance with the present invention.
Figure 4:
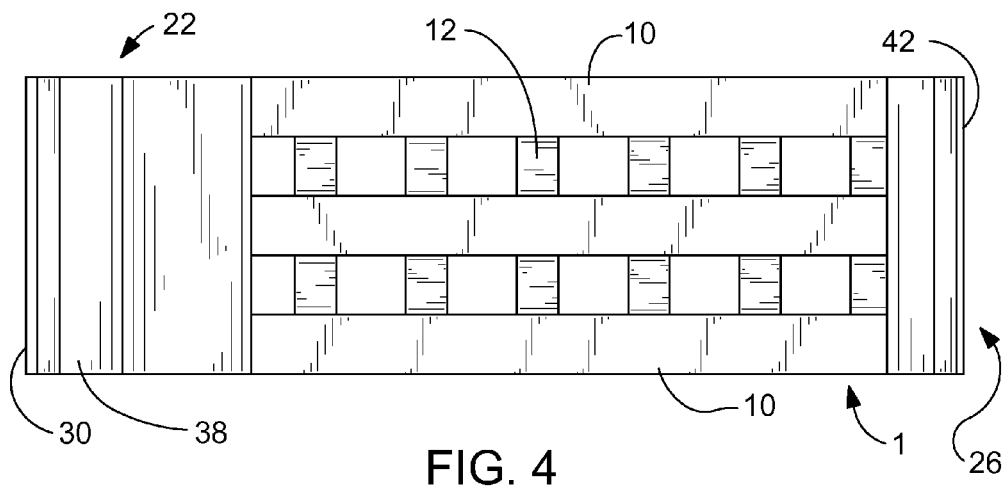
FIG. 4 is a bottom view of a combination ramp and load leveler in accordance with the present invention.

A chain tie 66 is attached to a top of the stake section 50 with welding or any suitable process. A chain 114 is inserted into the chain tie 66 and each end of the chain 114 is secured to the semi-trailer bed 102. The chain 114 is used to hold the adjustable stakes 52 in the stake pockets 112. With reference to FIG. 1a, a plurality of H-beam guides 68 are placed over a top lengthwise support member 10 to retain a support beam (not shown). Each H-beam guide 68 includes an "H" shaped cross section. With reference to FIG. 13, the weight of a load such as a plurality of poles 116 retains the H-beam guides 68 on the lengthwise support member 10. With reference to FIG. 13a, the combination ramp and load leveler 1 may be used to go from a lower bed 102 to an upper bed 103 of the semi-trailer 100.

The receiver section 54 includes a first retention finger 70 and a second retention finger 72, spaced apart from each other. A second retention extension 74 extends from the second retention finger 72 toward the first retention finger 70. The ends of the first retention finger 70 and the second retention extension 74 are preferably terminated with a substantially cylindrical end 76. The substantially cylindrical end 76 strengthens the end of the first retention finger 70 and the second retention extension 74. The first and second retention tubes are retained in the receiver section 54.

Figures 7, 9:
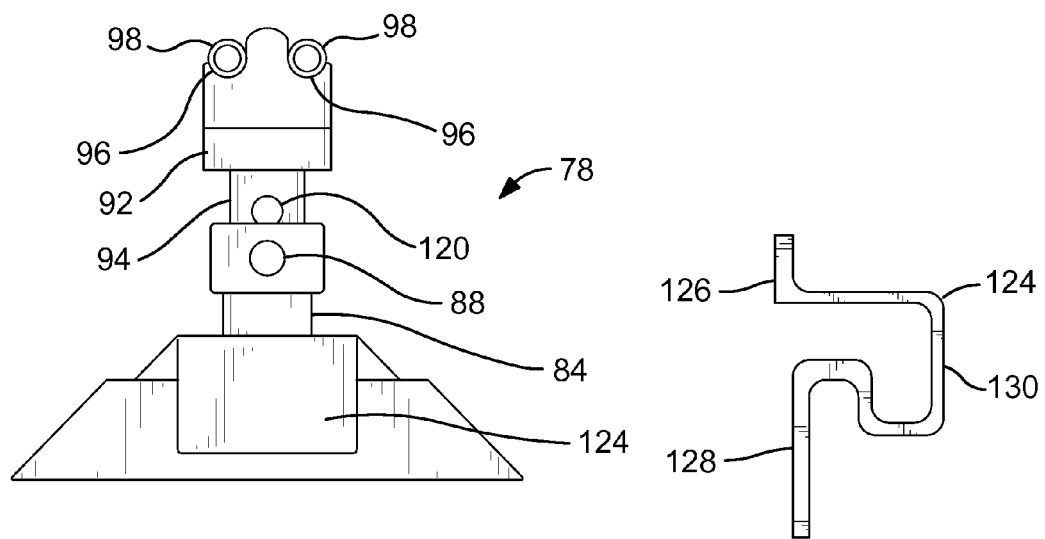
FIG. 7 is an end view of a ramp stand for a combination ramp and load leveler in accordance with the present invention.
FIG. 9 is an end view of an enlarged hanger hook of a ramp stand for a combination ramp and load leveler in accordance with the present invention.
Figure 8:
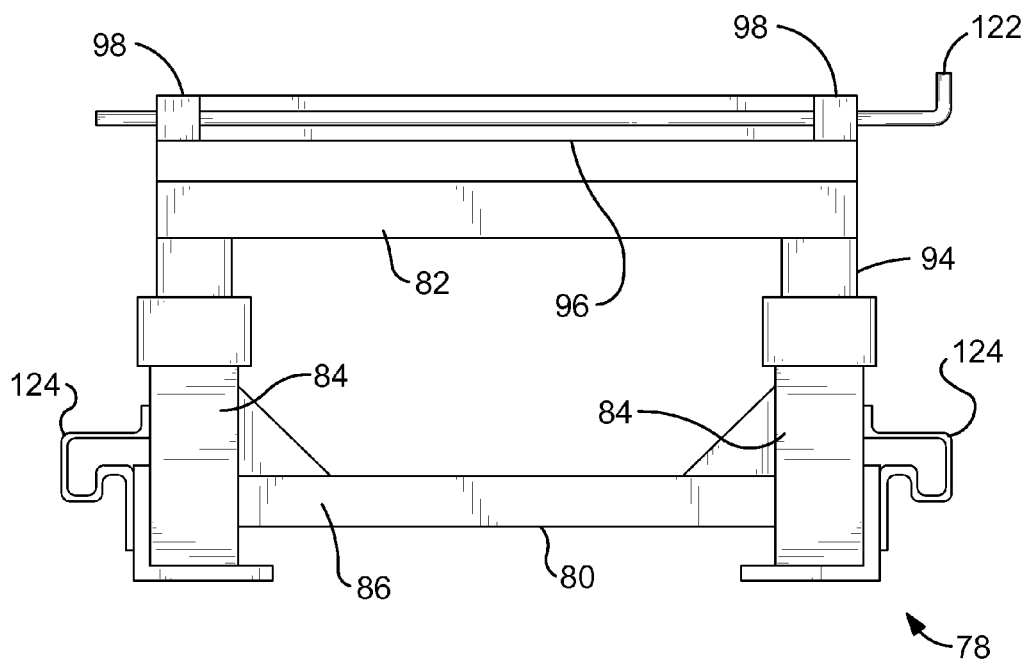
FIG. 8 is a front view of a ramp stand for a combination ramp and load leveler in accordance with the present invention.

With reference to FIGS. 7-9, a ramp stand 78 includes a support base 80 and an adjustable tube receiver 82. The support base 80 includes two receiver members 84 and a stand cross member 86. One of the two receiver members 84 is attached to one side of the stand cross member 86 and the other one of the two receiver members 84 is attached to the other side of the stand cross member 86. A base pin hole 88 is formed through a top of each receiver member 84 to receive a level pin 90. The adjustable tube receiver 82 includes a support cross member 92 and two tube extensions 94. The two tube extensions 94 are preferably attached to a bottom of the support cross member 92 at opposing ends with welding. The two tube extensions 94 are sized to be received by the two receiver members 84. A plurality of height holes 120 are formed through each tube extension 94 to receive the level pin 90.

Two adjacent semi-circular grooves 96 are formed across a length of the support cross member 92 to receive the first and/or second retention tubes. Two rod loops 98 are attached in each end of each semi-circular groove 96. A locking rod 122 is inserted through the two rod loops 98 and through the first or second retention tubes to retain the combination ramp and load leveler relative to the ramp stand 78. With reference to FIG. 9, an end view of an enlarged hanger hook 124 is shown. The hanger hook 124 is preferably fabricated from an extrusion. The hanger hook 124 includes a first mounting leg 126, a second mounting leg 128 and a mounting projection 130. The first and second mounting legs are preferably welded to the receiver member 84 of the support base 80.

With reference to FIG. 10, a first combination ramp and load leveler 1 is supported by the ground and the ramp stand 78. A second combination ramp and load leveler 1 is supported by the ramp stand 78 and the open drop deck semi-trailer 100. The prior art discloses using two different ramps for the first and second ramp positions. However, the first attachment end 22 and the second attachment end 26 of the combination ramp and load leveler 1 allows thereof to be used for both the first and second positions in FIG. 10. With reference to FIG. 10a, the combination ramp and load leveler 1 may be used to go from the ground to a bed 102 of the semi-trailer 100.

Figure 20:
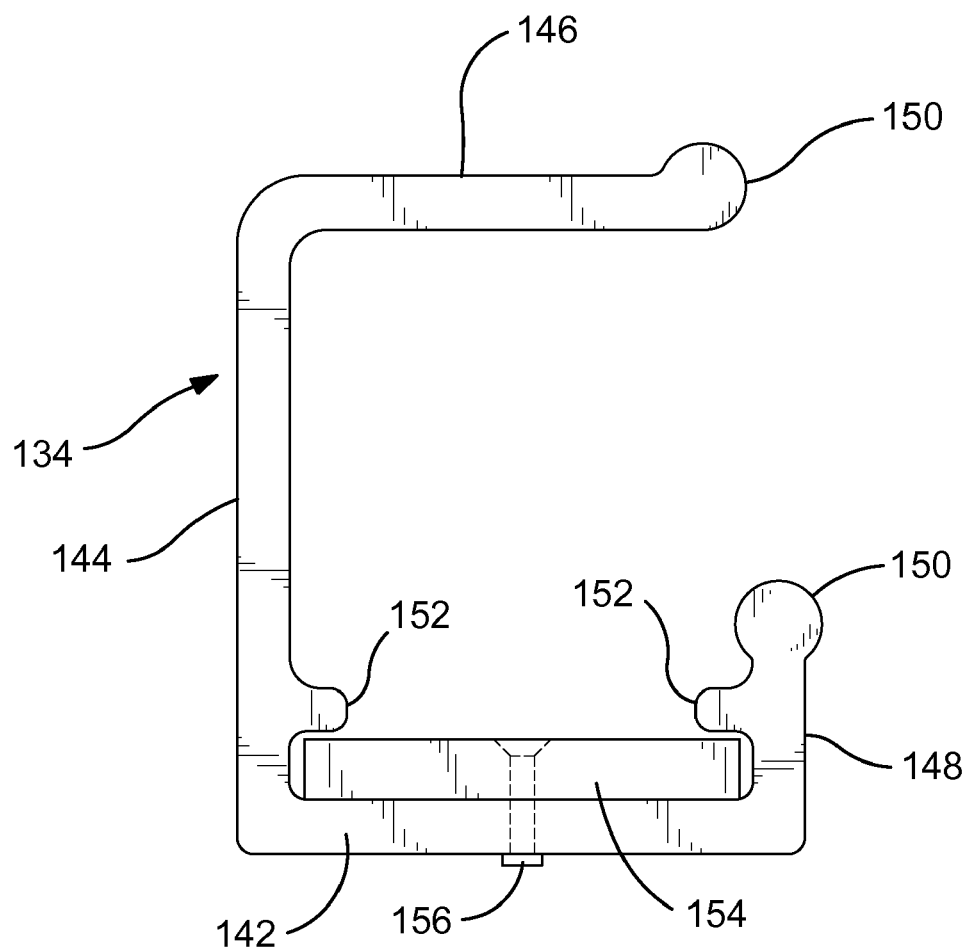
FIG. 20 is an enlarged end view of a hook receiver of a ramp stand hanger for a combination ramp and load leveler in accordance with the present invention.

With reference to FIGS. 18-20, an extended ramp stand hanger 132 includes a pair of hanger cradles 134, an angle 136, a back plate 138 and a mounting unit 140. Each hanger cradle 134 includes a bottom wall 142 a side wall 144, a top wall 146 and a side leg 148. The top wall 146 extends away from a top of the side wall 144 and the bottom wall 142 extends away from a bottom of the side wall 144. The side leg 148 extends upward toward the top wall 146. An end of the top wall 146 and the side leg 148 are preferably terminated with a substantial cylindrical end 150. Two opposing projections 152 are formed on an inside surface of the side wall 144 and the side leg 148. The two opposing projections 152 are used to retain a wear strip 154. The wear strip 154 is preferably axially retained with a rivet 156 or the like.

An end of the pair of hanger cradles 134 are attached to opposing ends of the angle 136. The angle 136 is attached to the back plate 138. The mounting unit 140 preferably includes two opposing attachment members 158 and a cross member 160. Each end of the cross member 160 is preferably mitered to receive a mitered end of each of the opposing attachment members 158. A plurality of mounting holes 162 are formed through the two opposing attachment members 158 for mounting the extended ramp stand hanger 132 to the I-beam 104 of the open drop deck semi-trailer 100. However, a normal ramp stand hanger would only include item numbers 134, 136 and 164. Item numbers 138 and 140 are added to the normal ramp stand hanger to create the extended ramp stand hanger 132.

A locking plate 164 is inserted through an end of each hanger cradle 134 to axially retain the ramp stand 78 in the hanger cradle 134. The locking plate 164 has a rectangular cross section to prevent wear from rotation thereof. The locking plate 164 is preferably fabricated from steel and coated. An opening is formed through a bottom of the locking plate 164 for the insertion of a pin 165 or a bolt of a lock to deter theft of the combination ramp and loader levelers 1.

Figure 21:
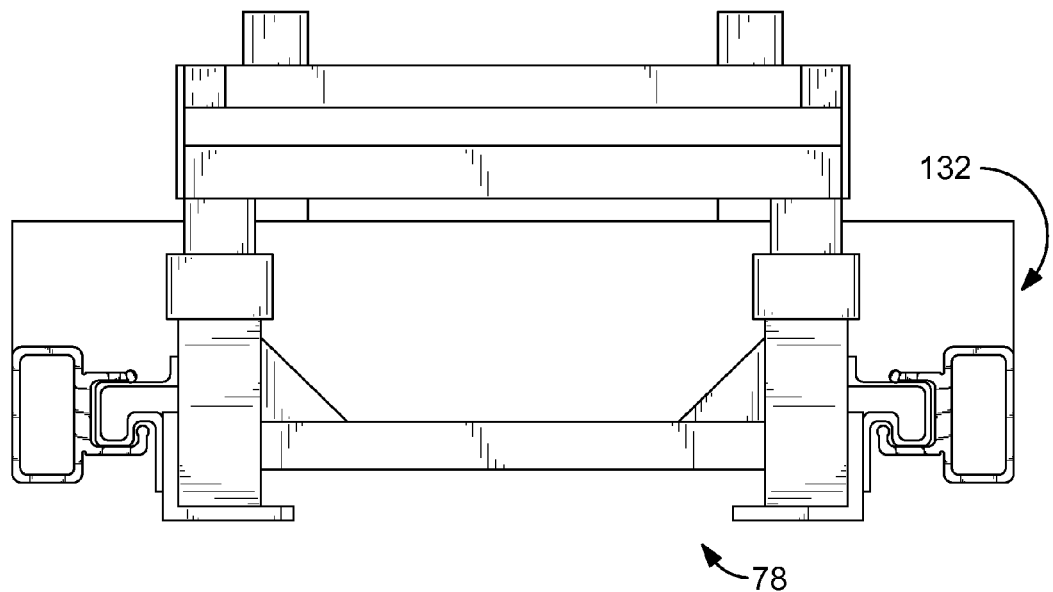
FIG. 21 is an end view of a ramp stand hanger retaining a ramp stand in accordance with the present invention.
Figure 22:
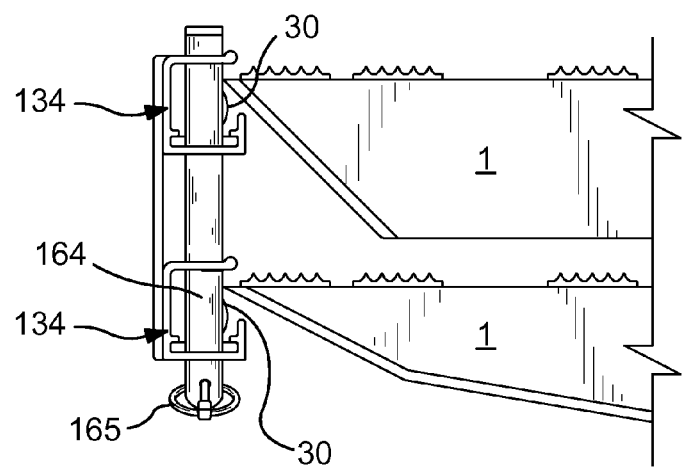
FIG. 22 is an enlarged end view of one end of two combination ramp and load levelers retained by a retention structure mounted to an open drop deck semi-trailer in accordance with the present invention.

With reference to FIG. 21, the ramp stand 78 is retained in the extended ramp stand hanger 132. With reference to FIG. 22, a pair of hanger cradles 134 are used to retain the first retention tubes 30 of the two combination ramp and load levelers 1. A single locking plate 164 is used to axially retained the first retention tubes in the hanger cradles 134.

However, the ramp does not need the extra features of the load leveler to operate as a ramp.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A ramp for open drop deck semi-trailers, comprising:
   at least two lengthwise support members, at least two of said at least two lengthwise support members being fabricated from a rectangular tube, said rectangular tube having two horizontal walls and two vertical walls, a thickness of said two horizontal walls is greater than a thickness of said two vertical walls; and
   means for supporting wheels of a vehicle being attached to one surface of said at least two lengthwise support members, said ramp having a height of no greater than about 5.25 inches.

2. The ramp for open drop deck semi-trailers of claim 1, further comprising:
   said means for supporting wheels is a plurality cross treads.

3. The ramp for open drop deck semi-trailers of claim 1, further comprising:
   a first retention tube being attached to one end of said at least two lengthwise support members and a second retention tube being attached to the other end of said at least two lengthwise support members.

4. The ramp for open drop deck semi-trailers of claim 3, further comprising:
   a first stake receiver retaining said first retention tube, a second stake receiver retaining said second retention tube.

5. The ramp for open drop deck semi-trailers of claim 4, further comprising:
   a first adjustable stake being retained in a bottom of said first stake receiver, a second adjustable stake being retained in a bottom of said second stake receiver, 180 degree rotation of at least one of said first and second adjustable stakes changing a distance between said first and second adjustable stakes, each one of said first and second adjustable stakes being sized to be received by a pair of stake pockets in different open semi-trailers having different distances therebetween.

6. The load leveler ramp for open drop deck semi-trailers of claim 3, further comprising:
   a ramp stand including a support base and an adjustable tube receiver, said adjustable tube receiver being vertically adjustable relative to said support base, said adjustable tube receiver including two adjacent semi-circular grooves that are sized to receive said first or second retention tubes.

7. The ramp for open drop deck semi-trailers of claim 1 wherein:
   a plurality of cross members being attached between said at least two lengthwise support members.

8. A ramp for open drop deck semi-trailers, comprising:
   at least two lengthwise support members being fabricated from an aluminum alloy having a tensile strength of at least 50,000 psi, at least two of said at least two lengthwise support members being fabricated from a rectangular tube, having walls of paired thicknesses; and
   means for supporting wheels of a vehicle being attached to one surface of said at least two lengthwise support members, said ramp having a height of no greater than about 5.25 inches, a load carrying capacity of said ramp is at least about 10,500 lbs.

9. The ramp for open drop deck semi-trailers of claim 8, further comprising:
   said means for supporting wheels is a plurality cross treads.

10. The ramp for open drop deck semi-trailers of claim 8, further comprising:
    a first retention tube being attached to one end of said at least two lengthwise support members and a second retention tube being attached to the other end of said at least two lengthwise support members; and
    a first stake receiver retaining said first retention tube, a second stake receiver retaining said second retention tube.

11. The ramp for open drop deck semi-trailers of claim 10, further comprising:
    a first adjustable stake being retained in a bottom of said first stake receiver, a second adjustable stake being retained in a bottom of said second stake receiver, 180 degree rotation of at least one of said first and second adjustable stakes changing a distance between said first and second adjustable stakes, each one of said first and second adjustable stakes being sized to be received by a pair of stake pockets in different open semi-trailers having different distances therebetween.

12. The ramp for open drop deck semi-trailers of claim 8, further comprising:
    a ramp stand including a support base and an adjustable tube receiver, said adjustable tube receiver being vertically adjustable relative to said support base, said adjustable tube receiver including two adjacent semi-circular grooves that are sized to receive said first or second retention tubes.

13. The ramp for open drop deck semi-trailers of claim 8 wherein:
    a plurality of cross members being attached between said at least two lengthwise support members.

14. The ramp for open drop deck semi-trailers of claim 11, further comprising:
    each one of said first and second adjustable stakes including a receiver portion and a stake portion extending from said receiver portion, said stake portion being sized to be received by the stake pocket.

15. The ramp for open drop deck semi-trailers of claim 8 wherein:
    a weight of said ramp is about 94 pounds.

16. A ramp for open drop deck semi-trailers, comprising:
    at least two lengthwise support members, at least two of said at least two lengthwise support members being fabricated from a rectangular tube, said rectangular tube having two horizontal walls and two vertical walls, a thickness of said two horizontal walls is greater than a thickness of said two vertical walls;

and means for supporting wheels of a vehicle being attached to one side of said at least two lengthwise support members, said ramp a load carrying capacity of said ramp is at least about 10,500 lbs.

17. The ramp for open drop deck semi-trailers of claim 16, further comprising:

a first retention tube being attached to one end of said at least two lengthwise support members and a second retention tube being attached to the other end of said at least two lengthwise support members.

18. The ramp for open drop deck semi-trailers of claim 17, further comprising:

a ramp stand including a support base and an adjustable tube receiver, said adjustable tube receiver being vertically adjustable relative to said support base, said adjustable tube receiver including two adjacent semi-circular grooves that are sized to receive said first or second retention tubes.

19. The ramp for open drop deck semi-trailers of claim 16 wherein:

a plurality of cross members being attached between said at least two lengthwise support members.

20. The ramp for open drop deck semi-trailers of claim 16 wherein:

a length of said ramp is about 96 inches.

* * * * *